H. R. HARRIGAN.
APPARATUS FOR INDICATING AND MEASURING THE TENSION OF A FOURDRINIER WIRE OR THE LIKE.
APPLICATION FILED SEPT. 27, 1915.
1,178,009.
Patented Apr. 4, 1916.
2 SHEETS—SHEET 1.
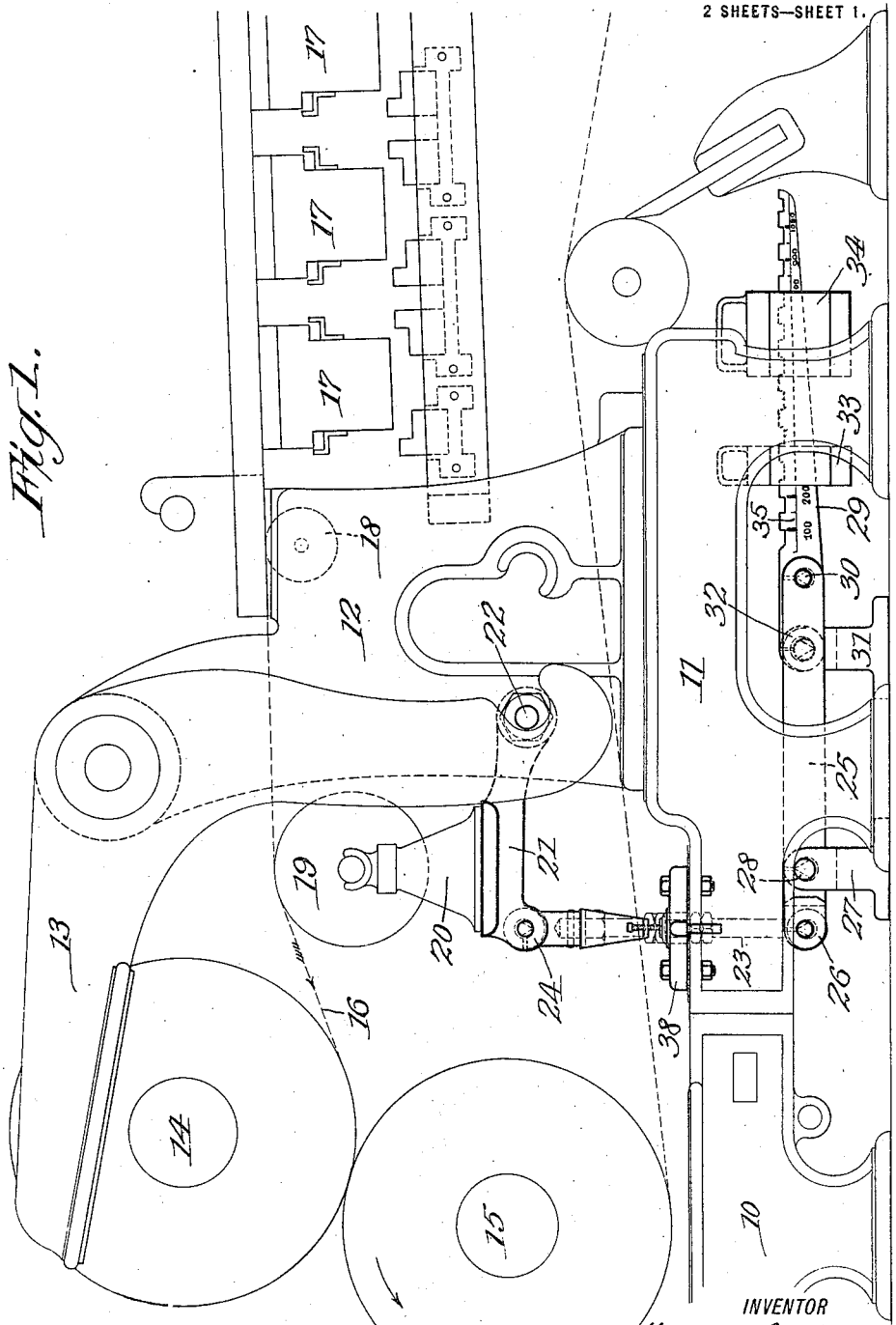
INVENTOR
Herman R. Harrigan
BY
Mauro, Cameron, Lewis & Massie
ATTORNEYS H. R. HARRIGAN.
APPARATUS FOR INDICATING AND MEASURING THE TENSION OF A FOURDRINIER WIRE OR THE LIKE.
APPLICATION FILED SEPT. 27, 1915.
1,178,009.
Patented Apr. 4, 1916.
2 SHEETS—SHEET 2.
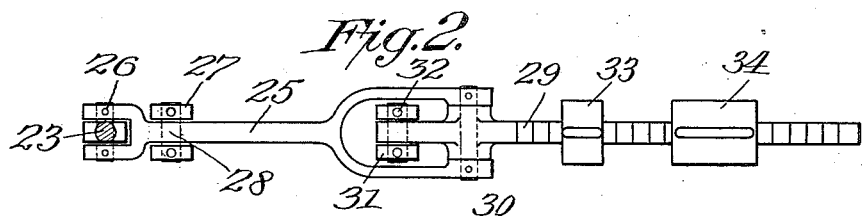
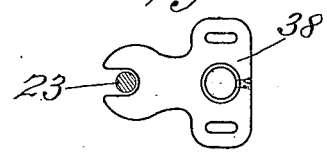
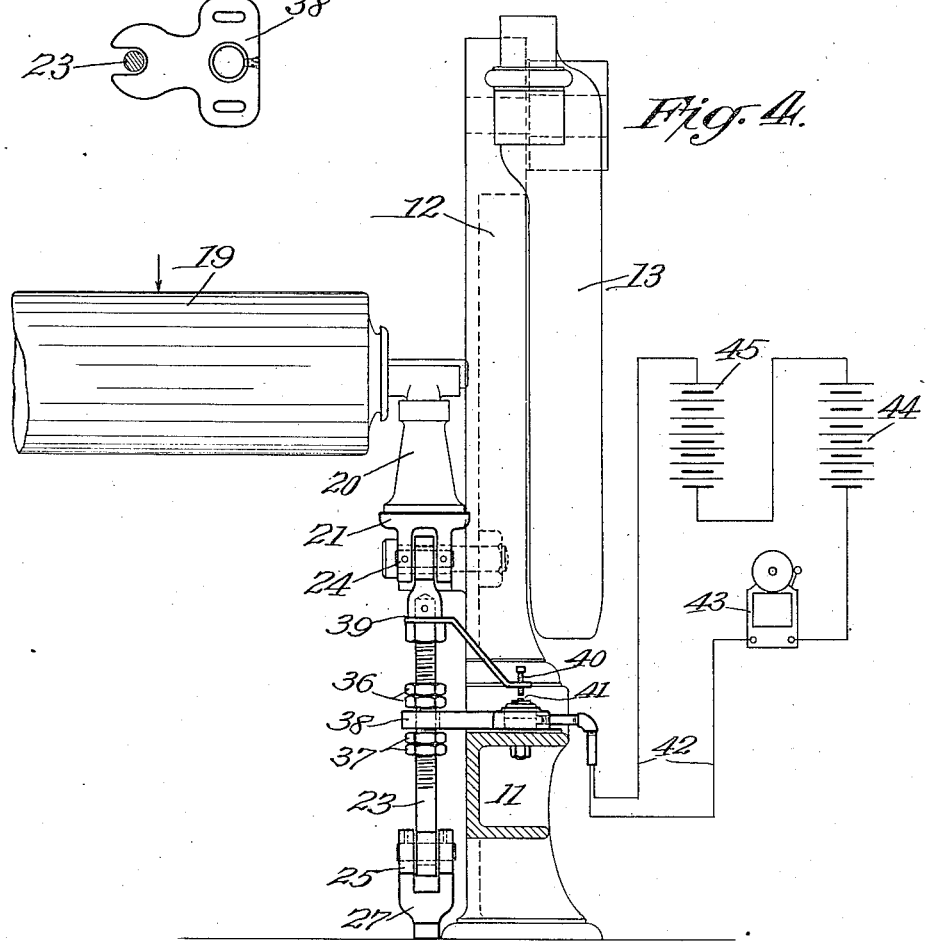
INVENTOR
Herman R. Harrigan
BY
Mauro, Cameron, Lewis & Massie
ATTORNEYS

UNITED STATES PATENT OFFICE.

HERMAN R. HARRIGAN, OF WILMINGTON, DELAWARE.

APPARATUS FOR INDICATING AND MEASURING THE TENSION OF A FOURDRINIER WIRE OR THE LIKE.

1,178,009.  Specification of Letters Patent.  Patented Apr. 4, 1916.

Application filed September 27, 1915. Serial No. 52,862.

*To all whom it may concern:*

Be it known that I, HERMAN R. HARRIGAN, a citizen of the United States of America, and a resident of Wilmington, Delaware, have invented a new and useful Improvement in Apparatus for Indicating and Measuring the Tension of a Fourdrinier Wire or the like, which invention is fully set forth in the following specification.

This invention relates to apparatus for measuring and indicating the tension in a moving apron or belt, such as a Fourdrinier wire, which is incorporated in paper-making or like machines; and the objects of the invention are to measure the tension of such a wire or apron during its travel, and to provide an indicator which will operate as a warning signal when the tension increases beyond a predetermined amount, so that the wire or apron may receive the needed attention.

The normal life of a Fourdrinier wire is only between two and three weeks, and such a wire costs between two and three hundred dollars. It is therefore a matter of great importance to protect the wire from undue tension, for excessive tension maintained for even limited periods would act to rupture or seriously injure the same, as the wire contracts and expands rapidly and frequently due to the conditions encountered at the wet end of the machine.

The invention will be better understood by reference to the accompanying drawings, illustrating one expression of the inventive idea, and wherein:—

Figure 1 is a side elevation showing the invention applied to a Fourdrinier wire in a paper-making machine; Fig. 2 is a plan view of the lever system; Fig. 3 is a plan view of the stop member with a part of the lever system passing therethrough; and Fig. 4 is an end elevation of a portion of the apparatus.

Referring to the drawings, wherein like reference numerals indicate like parts, 10 and 11 are portions of the machine frame, the portion 11 carrying a standard 12 upon which an arm 13 is mounted, which arm carries the upper couch-roll 14. A lower couch-roll 15 is carried on the frame portion 10 by means of standards (not shown). A Fourdrinier wire 16 receives the paper stock and carries it over the suction boxes 17 at the "wet" end of the machine. The arrows on the wire and the lower-couch roll 15 indicate the direction of movement of the Fourdrinier wire which, after leaving the suction boxes, passes over a roller 18 mounted between the suction boxes and couch-roll 15. The lower couch-roll 15 is the driver which imparts motion to the wire 16, and the tension of the wire is at its maximum just before it contacts with said couch-roll, as the retarding influences (such as the breast-roll, table rolls, stock, deckle straps, suction boxes, and roll 18), perform their various operations in contact with the wire before it reaches the couch-rolls. Since the maximum tension in the apron or wire 16 is between the roll 18 and the couch-rolls 14 and 15, as there are no elements which act to retard the wire located beyond roll 18, it is desirable to place any instruments for measuring and indicating the tension of the wire in contact with the wire at some point between the roll 18 and couch-rolls 14 and 15. For that reason, an element, here shown as a roll 19, is maintained in contact with the Fourdrinier wire at this point. The roll 19 is mounted on base members 20 and 21, one end of member 21 being pivoted in the frame 12 at 22, and the other end is secured to a connecting rod 23 at 24.

The couch-rolls 14 and 15 are located in definite positions relative to roll 19, and the wire in passing over roll 19 to the rolls 14 and 15 changes its direction of travel through an angle which is substantially constant, and the length of contacting surface of said apron with said roll 19 remains substantially constant. The lower end of the rod 23 is connected to suitable means for balancing the roll 19, as for example a system of levers provided with adjustable weights. As here shown, the lower end of rod 23 is connected to one end of a lever 25 at the point 26, the lever 25 being fulcrumed on a standard 27 at the point 28. The other end of the lever 25 is connected to a lever 29 at 30. This last-mentioned lever is fulcrumed in a standard 31 at the point 32. By means of weights 33 and 34, which are movable on the lever 29, the lever system, which includes connecting rod 23 and levers 25 and 29, is balanced against the tension of the wire through the roll 19. Lever 29 carries a scale 35 which is calibrated to measure the tension in the moving apron or wire 16. All fulcrum points, as indicated at 24, 26, 28, 30 and 32, are knife-edged in order to reduce friction.

The preferred construction of the levers is shown in Fig. 2, where one end of the lever 25 is shown yoked in order to fit around the connecting rod 23, and the other end yoked to fit around the lever 29.

The construction of the connecting rod 23 and its connections with the base member 21 and the lever 25 are clearly illustrated in Fig. 4. As there shown, the ends of said rod are suitably secured in bifurcated portions of member 21 and lever 25. A portion of the rod 23 is screw-threaded and receives lock nuts 36 and 37 which are adjusted to contact with an extending stop-member 38, which is held immovable on the frame 11, as the rod 23 moves up and down. By adjusting the lock nuts 36 and 37 with respect to stop 38, the degree of displacement of the roll 19 may be governed.

Means are associated with the rod 23 for indicating, through the displacement of roll 19, when the apron or wire 16 is subject to other than normal tension; and, as here shown, said connecting rod 23 is provided with an arm 39 which in turn carries an adjustable contact piece, such as a screw-threaded pin 40. Both the arm 39 and contact piece 40 are adapted to move with the roll 19. A button 41 is mounted on the stop-member 38 and is associated with electrical conductors 42, which are in circuit with an indicator 43, preferably a bell, and the batteries 44 and 45. When the contact piece 40 presses the button 41, the circuit will be closed through the indicator; and this will be effected should the roll 19 be moved downward an excessive distance, due to an increase in tension in the wire. Such an indication would denote that the Fourdrinier wire apron had tightened to such an extent as to require attention. This is a matter of great importance, as before indicated, in view of the large cost of these wires and the fact that their normal life is so short. Excessive tension maintained for even limited periods would act to rupture or seriously injure the wire, which contracts and expands rapidly and frequently due to the conditions encountered at the wet end of the machine.

In assembling the measuring and indicating apparatus, the lock nuts 37 are so positioned on the rod 23 that they will contact with the stop-member 38 when the roll 19 has been moved into normal position. The tension of the wire apron will be balanced by the lever system when the weights 33 and 34 are in positions to cause the roll 19 to press upward with a force equal to the downward pressure of the Fourdrinier wire. The positions of the weights 33 and 34, when the lever system is balanced, indicate the tension in the Fourdrinier wire 16, as the scale 35 on the lever 29 is preferably calibrated in tension units. The balancing of the lever system carries the arm 39 and contact 40 to a position which is at a definite distance from the button 41, and when the tension increases in the apron 16, the roll 19 is forced downward and the lever system becomes unbalanced. The lock nuts 36 will contact with the member 38, after movement of the roll 19 a predetermined distance, and prevent too great a movement downward of the roll 19. When the system becomes unbalanced, the weights may be adjusted to counteract the additional tension of the wire, and the amount of this excessive tension is indicated on the scale.

When the wire is placed on the machine the weights 33 and 34 are set at the proper positions on the lever arm, which positions are determined by the width and strength of the wire. If after the weights have been placed in position, the pressure on the roll 19 should be so great that the alarm is sounded, it would be necessary to relieve the tension from the wire either by slacking the wire tightener or by reducing the vacuum on one or more of the suction boxes, or by reducing the friction of the wire carrying rolls by lubrication or otherwise, or by reducing the thickness of the stock, thus relieving the resistance at the suction boxes.

While, for the purpose of illustration, one expression of the inventive idea has been shown and described in detail, it is to be understood that the invention is not limited to this construction, but that the inventive idea is susceptible of various mechanical expressions within the limits of the appended claims.

What is claimed is:—

1. In a paper-making machine, an endless moving apron, a bodily-movable yieldably mounted element contacting therewith, lever means for partially supporting said element in contact with said apron, and means operable by movement of said element for indicating excessive tension of said apron.

2. In a paper-making machine, an endless yieldably mounted element, a wire apron running in contact with said element, tension-measuring lever means for holding said element in contact with said apron, and means operated by movement of said element for indicating excessive tension of said apron.

3. In a paper-making machine, an endless wire apron, a yieldably mounted element contacting therewith at the point of maximum tension of said apron, a tension-measuring means for normally holding said element in contact with said wire and for measuring the tension of said wire, and means operable by movement of said element for indicating excessive tension of said wire.

4. In a paper-making machine, the combination of a suction box, a couch-roll, a Fourdrinier wire passing over said suction box and couch-roll, a yieldably mounted element engaging said wire at a point between said suction box and couch-roll, a tension-measuring means for normally holding said element in contact with said wire and for measuring the tension of said wire, and means operable by movement of said element for indicating the tension of said wire.

5. In a paper-making machine, an endless moving apron, a yieldably mounted roll contacting therewith, a system of levers with weights on one end of one of said levers for partially supporting said roll in normal position, and means responsive to movement of said roll for indicating excessive tension in said apron.

6. In a paper-making machine, an endless moving apron, a yieldably mounted roll contacting therewith, a system of levers for partially supporting said roll in normal position, and means associated with said lever system for measuring the tension of said apron.

7. In a paper-making machine, an endless moving apron, a yieldably mounted roll contacting therewith, a system of levers for partially supporting said roll in normal position, means associated with said lever system for measuring the tension of said apron, and means operable by movement of said roll in one direction for indicating excessive tension in said apron.

8. In a paper-making machine, a moving apron, a yieldably mounted roll contacting therewith, tension-measuring means for normally holding said roll against said apron, an electric circuit including an indicator, and a member carried by said measuring means for closing said circuit through said indicator when the movement of said roll is abnormal.

9. In a paper-making machine, a moving apron, a yieldably mounted roll contacting therewith, tension-measuring means for normally holding said roll against said apron, and audible signal device, an electric circuit therefor, and a contacting means carried by said measuring means for closing said circuit through said signal device when the movement of said roll is abnormal.

10. In a paper-making machine, a moving apron, a roll partly supported by the frame of said machine and adapted to contact with said apron, a system of levers having sharp edge fulcrums adapted to partly support said roll, means associated with said lever system for moving said roll to normal position and for measuring the tension in said apron, an indicator, and means carried by said lever system for causing said indicator to operate when said roll is moved in one direction more than a predetermined amount, the said indicator being inoperative when the roll is moved less than the said predetermined amount.

11. In a paper-making machine, a moving apron, a roll supported in part on the frame of said machine and adapted to contact with said apron, a system of levers having sharp edge fulcrums adapted to partly support said roll, means associated with said lever system for moving said roll to normal position and for measuring the tension in said apron, an indicator, an electric circuit therefor, and a member carried by said lever system for closing said circuit to said indicator when the roll is abnormally moved.

12. In a paper-making machine, a tension indicator, an electric circuit therefor, a moving apron, a yieldable roll for contacting with said apron, a balanced lever system for holding said roll in normal position, and contacts normally held apart when said roll is in normal position and forced into engagement to close the circuit through said indicator when the tension in said apron forces said roll out of normal position.

In testimony whereof I have signed this specification in the presence of two subscribing witnesses.

HERMAN R. HARRIGAN.

Witnesses:
EDWARD MARTIN,
GEO. E. SANDS.